United States Patent [19]

Koch

[11] Patent Number: 4,737,223

[45] Date of Patent: Apr. 12, 1988

[54] LABEL DISPENSER COMPRESSION ROLLER

[75] Inventor: Ulf Koch, Eberbach, Fed. Rep. of Germany

[73] Assignee: Esselte Pendaflex Corp., Garden City, N.Y.

[21] Appl. No.: 854,915

[22] Filed: Apr. 23, 1986

[30] Foreign Application Priority Data

Apr. 30, 1985 [DE] Fed. Rep. of Germany ....... 3515594

[51] Int. Cl.[4] ........................ B32B 31/00; B44C 7/00; B02C 4/00

[52] U.S. Cl. .................................... 156/475; 156/541; 156/577; 156/579; 221/73; 29/121.6

[58] Field of Search ............... 156/384, 475, 493, 541, 156/542, 555, 577, 579, 582, DIG. 39, DIG. 48, 216, 468; 384/222, 582, 536; 242/198, 77.1; 221/210, 311, 73

[56] References Cited

U.S. PATENT DOCUMENTS

| | | | |
|---|---|---|---|
| 292,958 | 2/1884 | Smith | 29/121.6 |
| 2,583,515 | 1/1952 | Mayner | 29/121.5 |
| 3,135,025 | 6/1964 | Abbott | 29/121.5 |
| 3,545,371 | 12/1970 | Reist | 29/121.6 |
| 3,576,295 | 4/1971 | Hale | 242/77.1 |
| 3,812,562 | 5/1974 | Lovett | 29/121.5 |
| 4,249,973 | 2/1981 | Hamisch, Jr. | 156/216 |
| 4,267,006 | 5/1981 | Karu | 156/577 |
| 4,422,780 | 12/1983 | Glaeser | 384/582 |
| 4,486,258 | 12/1984 | Schrotz et al. | 156/DIG. 39 |
| 4,626,313 | 12/1986 | Karp | 156/541 |

FOREIGN PATENT DOCUMENTS

| | | | |
|---|---|---|---|
| 3030153 | 8/1980 | Fed. Rep. of Germany . | |
| 144623 | 3/1954 | Switzerland | 384/582 |

*Primary Examiner*—Donald E. Czaja
*Assistant Examiner*—Louis Falasco
*Attorney, Agent, or Firm*—Gerald J. Ferguson, Jr.; Michael P. Hoffman; Michael J. Foycik, Jr.

[57] ABSTRACT

The invention concerns a label dispenser to dispense and deposit stick-on labels, whereby in each operational cycle one stick-on label is moved into a dispensing position below a compression roller with a contoured surface and a sleeve by means of which the compression roller is rotatably supported on a fixed shaft. The compression roller comprises individually designed cross-sectionally contoured rings which rest through spring elements mounted to their interiors on the sleeve.

8 Claims, 4 Drawing Sheets

LABEL DISPENSER COMPRESSION ROLLER

BACKGROUND OF THE INVENTION

The present invention concerns a label dispenser to issue and apply stick-on labels and which in every operational cycle moves a stick-on label into a dispensing position below a compression roller provided with a contoured surface and a sleeve by means of which the compression roller is rotatably supported on a fixed shaft.

Such a label dispenser is known from German Patent No. 30 30 153. This known label dispenser has a compression roller with a contoured surface and sleeve by means of which this compression roller is rotatably supported on a fixed shaft. The roller is a relatively soft plastic in order to achieve some matching of this compression roller to the surface of the object to be labeled.

Immediately before being deposited, the label is printed. The printing ink does not dry by evaporation, but rather by penetrating the label material. It does happen, on account of the rapid operational sequence during marking and labeling, that the contoured surface comes into contact with printed symbols which have not yet dried. The soft plastic tends to adsorb but not absorb the ink. This means that the ink-wetted portion of the surface at its next contact with a label or with the surface of the object to be labeled will deposit the ink thereon. As a result, unsightly streaks appear on the printed labels. These streaks are particularly disadvantageous where the labels must be provided with machine-readable print. Frequently, these streaks make automatic reading by photo-electric converters impossible.

It is furthermore known (German Offenlegungsschrift No. (32 07 053) to use a relatively hard plastic for the rollers. This material is highly ink-repellant, whereby the above streaking is largely averted. In order to obtain the required elasticity in the compression roller (i.e., matching to the surface of the object to be labeled), the compression roller of the known dispenser is rotatably supported at a middle zone of its length on an elastically deformable shaft. This middle zone is adjoined on both sides by shaft passages extending as far as the end faces of the compression roller, the compression roller surrounding the shaft with play within these passages.

While compression rollers of this kind substantially avoid unintended soiling of the labels by ink streaks, a matching of the surface to the objects being labeled on the other hand is possible in only a limited way. Essentially, such matching is limited to oblique surfaces. Such compression rollers make it difficult and perhaps impossible to presss the labels in a fully adhering manner illustratively on transversely curving surfaces such as bottles and cans.

Based on the state of the art of the label dispenser of the German Patent No. 30 30 153, it is the object of the present invention to create a compression roller with the required elasticity to match the surface of the object to be marked without thereby adversely affecting the print quality of the label.

This problem is solved by the invention by the compression roller being provided with individual, cross-sectionally contoured rings supported on a sleeve by spring elements mounted to their interiors.

This design makes it possible to fit the compression roller to the particular requirements, i.e. matching to the label format an arbitrary number of cross-sectionally contoured rings.

Furthermore, it is possible to use a hard roller material for these rings and thereby to avoid the danger of ink adsorption. In spite of the hard material of the rings, the compression roller is highly elastic, because of the inset spring elements, whereby it can match in an outstanding manner the particular topologies of the labeled objects.

Preferably, the spring means are mounted in mutually opposite grooves inside the cross-sectionally contoured rings, i.e., on the outside of the sleeve. Typically, such spring means are composed of a rubber material.

Preferably, the sleeve is of one piece.

In an especially preferred embodiment, the sleeve comprises individual sleeve elements, the ring length being less than the sleeve-element length. This embodiment makes it possible to change the length of the compression roller by serially arranging several sleeve elements with corresponding shaped rings and thereby to achieve a more extensive match for the particular label dispensers used.

In another especially preferred embodiment, the sleeve comprises individual sleeve elements, with the length of the cross-sectionally contoured rings being equal to the sleeve-element length. Spacer rings are preferably used in this embodiment with an outside diameter less than that of the contoured rings. Advantageously, the length of two such spacer rings equals the length of one contoured ring. This embodiment is especially advantageous because tipping or warping of the shaped rings is prevented thereby.

In a further especially preferred embodiment, the cross-sectionally contoured rings have different outside diameters. This embodiment makes it possible in an especially simple way to apply labels to transversely curved surfaces such as conical insides in the textile industry and the outsides of bottles and cans.

BRIEF DESCRIPTION OF THE DRAWING

The invention will be further illustrated by reference to the accompanying drawings, in which.

DETAILED DESCRIPTION OF A PREFERRED EMBODIMENT OF THE INVENTION

Figure 1:
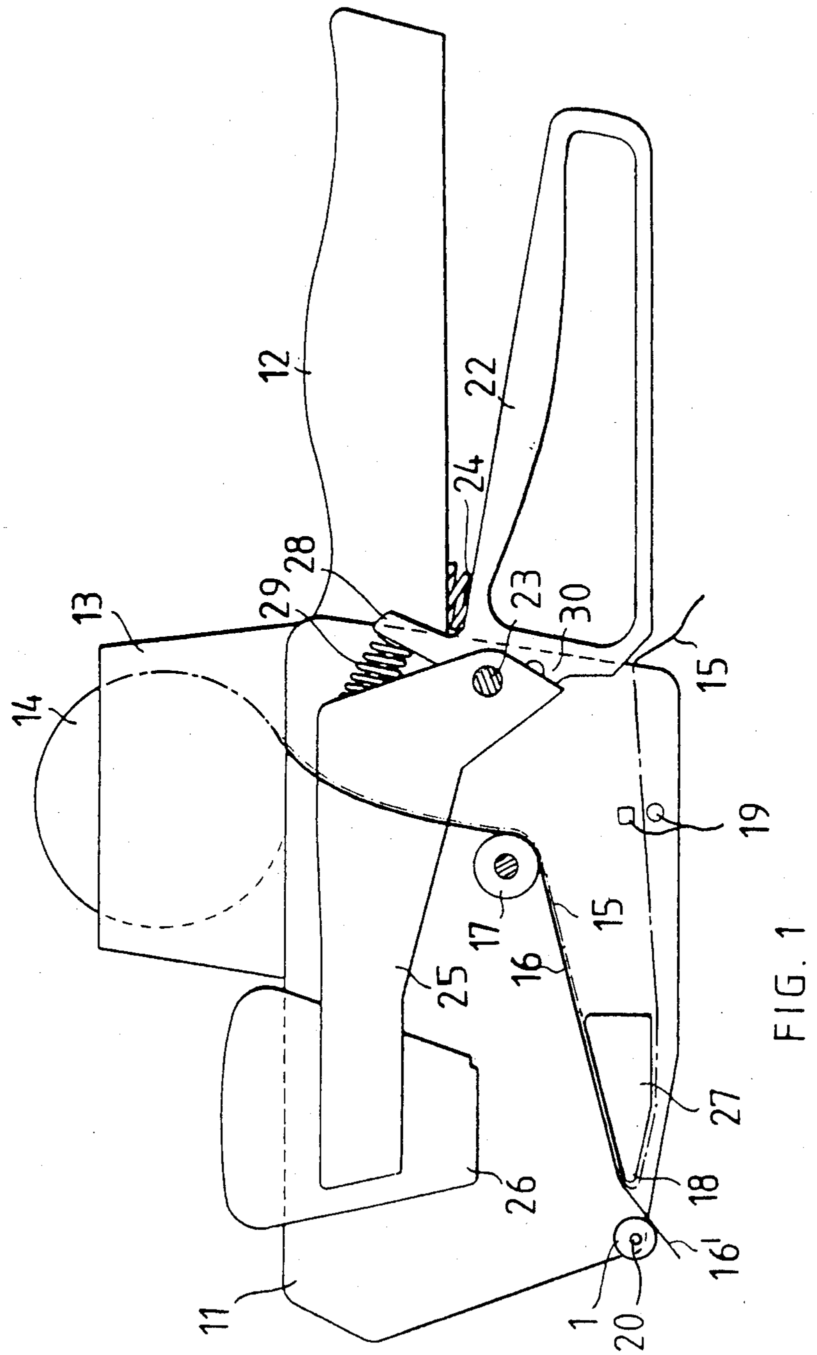
FIG. 1 is a schematic view of a label dispenser.

The label dispenser shown in FIG. 1 comprises a housing with a handle 12. The housing upper part includes a duct 13 receiving a supply spool 14 of a carrier tape 15 to which the stick-on labels 16 adhere. In the dispenser, the carrier tape 15 passes from the duct 13 first downwardly and, following deflection at a roller 17, forward to a dispensing edge 18 where the carrier tape 15 is reversed and is guided past a schematically shown transport means 19 to the rear of the housing. A compression roller 1 is rotatably supported on a shaft 20 in front of the dispensing edge 18 of a printing platform 27 and is used separating labels 16 from the carrier tape 15 and is shown in the dispensing position, for dispensing a label 16 onto an object by moving the compression roller 1 on the object.

An operating lever 22 is mounted underneath the handle 12 and is rotatably supported on a shaft 23. A spring 24 is located between the handle 12 and the operating lever 22 to bias the operating lever 22 toward the rest position shown in FIG. 1. The housing 11 further receives a printing lever 25 which is also rotatably supported on the shaft 23. This printing lever 25 supports a printing movement 26 which allows printing a stick-on label 16 located on a printing platform 27. A spring 29 is mounted between an arm 28 of the operating lever 22 and the printing lever 25 to transmit a motion of the operating lever 22 in the direction of the handle 12 to the printing lever 25. In the rest position shown in FIG. 1, the printing lever 25 is kept in the lifted position by a beak 30 at the operating lever 22.

It is assumed for a brief description of an operation cycle of the dispenser shown in FIG. 1 that as yet no stick-on label is in the dispensing position below the compression roller 1. To initiate an operation cycle, the operating lever 22 is pulled toward the handle 12 whereby the printing lever 25, because of the action of the arm 28 and of the spring 29, is pivoted counterclockwise about the shaft 23, so that the printing movement 26 is lowered onto the printing platform 27. Upon impacting the printing platform 27, the printing movement 26 produces a print on that stick-on label 16 which happens to be on the printing platform 27 at the time. By means of a lever system, omitted from the drawing, the transport means 19 simultaneously is moved from the position shown in FIG. 1 along the carrier tape 15 toward the printing platform 27.

When the operating lever 22 is released, the spring 24 moves it back into the initial position shown in FIG. 1, the beak 30 pivoting the printing lever 25 back clockwise into its initial position about the shaft 23. Simultaneously, again the transport means 19 is returned into its initial position shown in FIG. 1; during this motion, however, it firmly engages the carrier tape 15 which therefore is being pulled about the dispensing edge 18 by an amount corresponding to the length of a stick-on label. In the process, a stick-on label detaches at the dispensing edge 18 from the carrier tape 15 and arrives at the position of the stick-on label 16′ below the compression roller 1. The stick-on label 16′ now may be made to adhere to an object by means of a rolling motion of the compression roller 1.

FIGS. 2 through 5 are sections or partial views of compression rollers 1 that can be used in the dispenser of FIG. 1.

In all embodiments, the compression roller 1 is provided where called for with individually designed, cross-sectionally contoured rings 2 resting by means of a spring element 4 mounted to their interiors on the sleeve 5. Each of the spring elements 4 can be of rubber material. Each of the rings 2 can be hard plastic material which is ink-repelling and resistant to wetting. These spring elements 4 are seated in mutually opposite grooves 6 and 7 on the interior 3 of the contoured rings 2 and on the outside of the sleeves 5.

Figure 2:
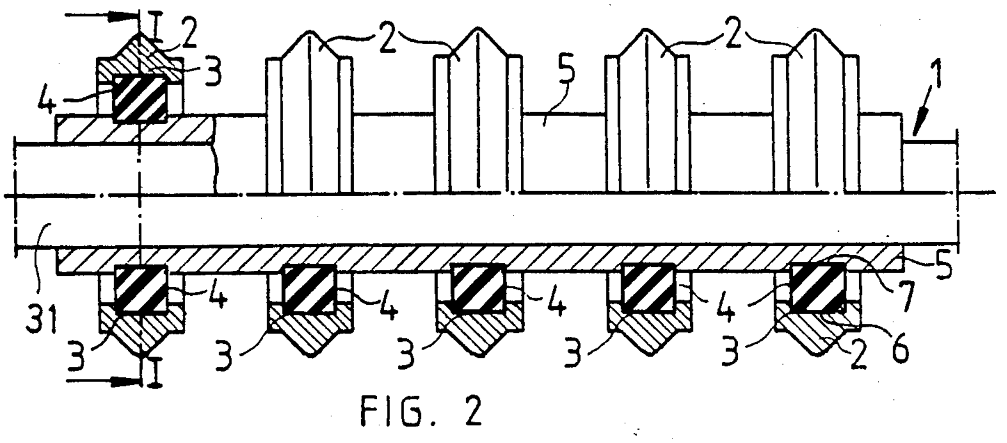
FIG. 2 is a section through the compression roller shown in a first embodiment of the dispenser of FIG. 1.
Figure 3:
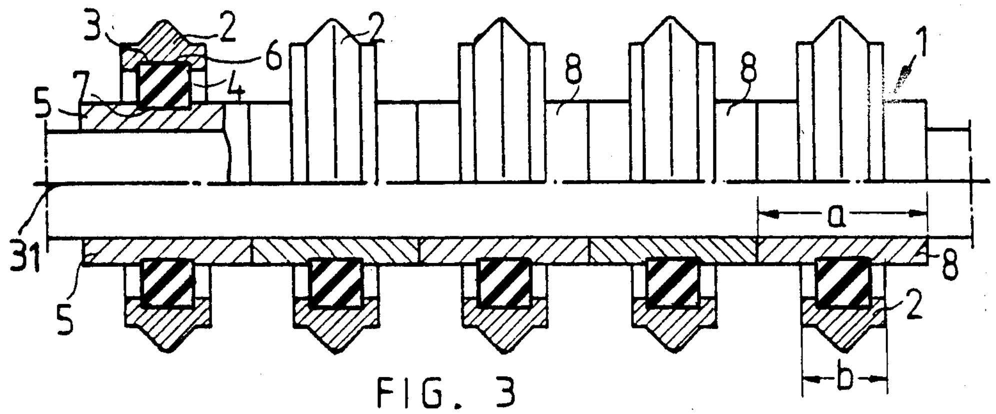
FIG. 3 is a section of the compression roller of a second embodiment of the dispenser of FIG. 1.

The sleeve 5 shown in FIG. 2 is of one piece. On the other hand, the compression roller 1 of FIG. 3 includes a sleeve 5 with several individual sleeve elements 8 and of a length a exceeding the length b of the contoured rings 2. It is possible in this embodiment to sequentially array several sleeve elements 8 with corresponding contoured rings 2 to achieve a change in length of the compression roller and to better match the particular label dispenser used.

Figure 4:
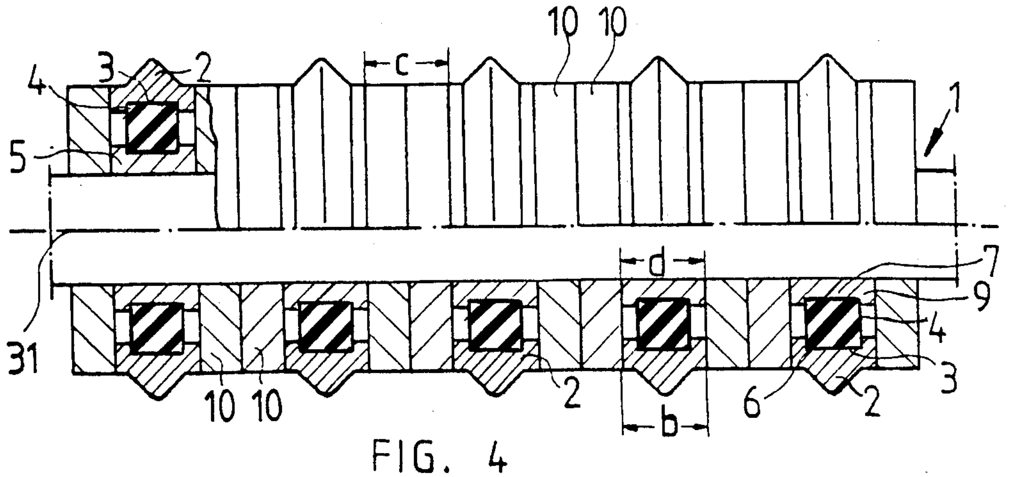
FIG. 4 is a section of a third embodiment of a compression roller of the dispenser of FIG. 1.

In the embodiment shown in FIG. 4, additional spacer rings 10 are located between the cross-sectionally contoured rings 2. It is easily seen when comparing FIGS. 2 and 3 with FIG. 4 that if a sideways pressure were applied to the contoured rings 2 of FIGS. 2 and 3, they might excessively tip over or warp.

This warping is prevented by the spacer rings 10 shown in FIG. 4. The length b of the contoured rings 2 in this embodiment equals the length d of the sleeve elements 9. The spacer rings 10 with an outside diameter less than that of the contoured rings 2 are mounted between these contoured rings 2. The length c of every two spacer rings 10 equals the length b of one contoured ring. These spacer rings 10 slide along the fixed shaft 31 the way the sleeve elements 9 do. By varying the number of contoured rings and spacer rings, it is possible to arbitrarily change the length of the compression roller.

Figure 5:
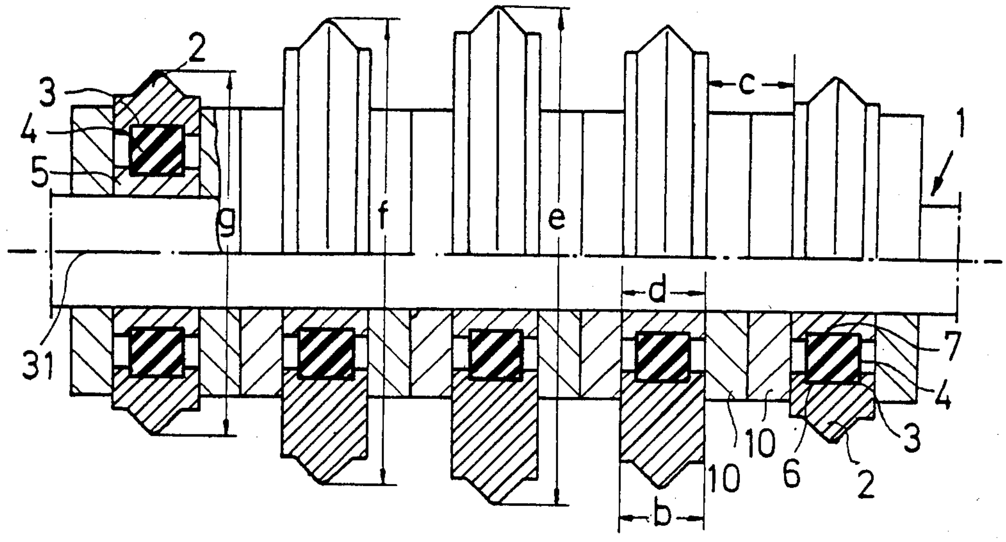
FIG. 5 is a section of a fourth embodiment of a compression roller of the dispenser of FIG. 1.
Figure 6:
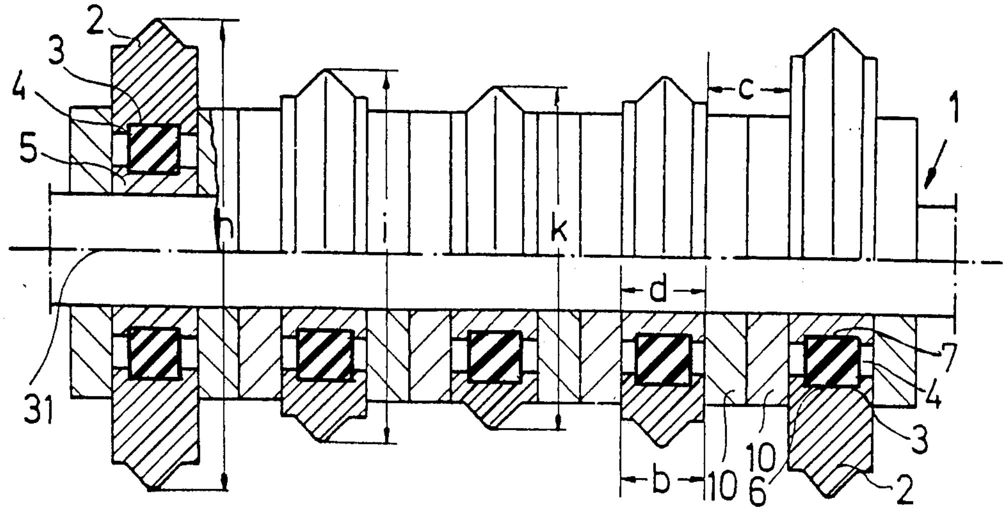
FIG. 6 is a section of a fifth embodiment of the compression roller of the dispenser of FIG. 1; and, FIG. 7 is a section along the line I—I shown in FIG. 2.

FIGS. 5 and 6 show two embodiments for which the cross-sectionally contoured rings 2 have different outside diameters. In the embodiment of FIG. 5, the outer periphery of the compression roller is barrel-shaped. These compression rollers are especially well suited to mark transversely curving, concave surfaces such as yarn cones in the textile industry. In the embodiment of FIG. 6, the compression roller has a concave outer periphery. These compression rollers are especially well suited for transversely curving, convex surfaces, i.e., bottles and cans, to be labeled.

Figure 7:
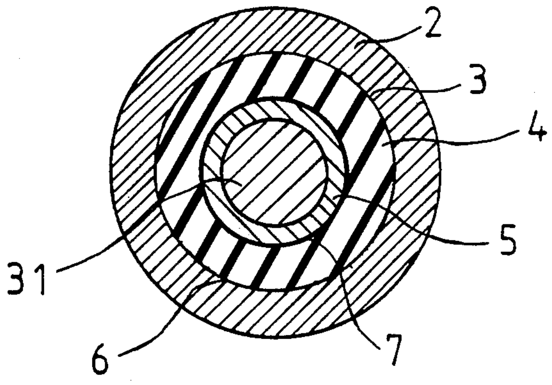

FIG. 7 is a cross-section of the compression roller of FIG. 2. It shows the sleeve 5 on the shaft 31 supporting the spring element 4 in the groove 7. Typically, this spring element is annular. The cross-sectionally contoured ring 2 with a groove 6 on the interior thereof is located on the spring element 4.

If the compression roller is on the label, the spring element 4 may balance the pressure on the contoured rings 2. The sleeve 5 rotates on the shaft 31. The longitudinal section of the contoured rings 2 of FIGS. 2 through 5 clearly shows that the contoured rings evince a tip, shown in cross-section, whereby the frictional surface on the label surface is minimal. As a result, smearing of the marking is avoided. Because of the elasticity imparted to the contoured rings 2 by the spring elements 4, it is possible to make the contoured rings from an ink-repelling plastic which is resistant to wetting.

All embodiments permit variation in the number of the contoured rings 2 when the length of the shaft 31 is constant.

List of reference numerals: 1 compression roller; 2 cross-sectionally contoured ring; 3 interior surface of the contoured ring; 4 spring element; 5 sleeve; 6 groove; 7 groove; 8 sleeve element; 9 sleeve element; 10 spacer ring; 11 housing; 12 handle; 13 duct; 14 supply spool; 15 carrier tape; 16 stick-on label; 17 roller; 18 dispensing edge; 19 transport means; 20 shaft; 22 operating lever; 23 shaft; 24 spring; 25 printing lever; 26 printing movement; 27 printing platform; 28 arm; 29 spring; 30 beak; 31 shaft; a length of the sleeve element 8; b length of the cross-sectionally contoured ring 2; c length of two spacer rings 10; d length of the sleeve element 9; and, e through k outside diameter of a contoured ring 2.

It will be obvious to those skilled in the art that many modifications may be made within the scope of the present invention without departing from the spirit thereof, and the invention includes all such modifications.

What is claimed is:

1. A label dispenser for dispensing and depositing stick-on labels in which, in each operational cycle, a stick-on label is moved into a dispensing position, comprising a compression roller having a contoured surface;

a sleeve means;

a fixed shaft means for rotatably supporting said sleeve means whereby said sleeve means is rotatably supported on said fixed shaft means;

said compression roller including at least one cross-sectionally contoured ring supported in spaced relationship from said sleeve means by a spring element; said contoured ring having an interior surface thereof adapted to receive an outer portion of said spring element; said sleeve means having an outer surface which is adapted to receive an inner portion of said spring element;

whereby pressure applied to said at least one cross-sectionally contoured ring results in displacement thereof relative to said sleeve means due to resilient deformation of said spring element.

2. A label dispenser according to claim 1, in which said sleeve means and said cross-sectionally contoured ring have mutually opposed grooves respectively in the interior surfaces thereof for fixedly receiving, respectively, said interior portion and said exterior portion of said spring member.

3. A label dispenser according to claim 1 or 2, in which said sleeve means is a single unitary body.

4. A label dispenser according to claim 1 or 2, in which said sleeve includes a plurality of individual sleeve elements, a length of each of said cross-sectionally contoured rings being less than a length (a) of said sleeve elements.

5. A label dispenser according to claim 1 or 2 in which said sleeve means includes a plurality of individual sleeve elements, a length (b) of said cross-sectionally contoured rings being approximately the same as a length (d) of the sleeve elements.

6. A label dispenser according to claim 1, including a plurality of spacer rings which are disposed between said cross-sectionally contoured rings, each of said spacer rings having an outside diameter which is smaller in magnitude than an outside diameter of ones of said cross-sectionally contoured rings.

7. A label dispenser according to claim 6, in which a length (c) of every pair of spacer rings (10) equals a length (b) of one of said cross-sectionally contoured rings.

8. A label dispenser according to claim 1, in which the cross-sectionally contoured rings each have differing outside diameters.

* * * * *